United States Patent
Lee et al.

(10) Patent No.: US 10,854,384 B2
(45) Date of Patent: Dec. 1, 2020

(54) MULTILAYER CERAMIC ELECTRONIC COMPONENT

(71) Applicant: SAMSUNG ELECTRO-MECHANICS CO., LTD., Suwon-si (KR)

(72) Inventors: Sun Cheol Lee, Suwon-si (KR); Gi Seok Jeong, Suwon-Si (KR); Ho In Jun, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/205,639

(22) Filed: Nov. 30, 2018

(65) Prior Publication Data
US 2020/0118749 A1    Apr. 16, 2020

(30) Foreign Application Priority Data
Oct. 10, 2018    (KR) .......................... 10-2018-0120587

(51) Int. Cl.
*H01G 4/012*    (2006.01)
*H01G 4/232*    (2006.01)
(Continued)

(52) U.S. Cl.
CPC ............ *H01G 4/012* (2013.01); *H01G 4/008* (2013.01); *H01G 4/232* (2013.01); *H01G 4/1227* (2013.01); *H01G 4/30* (2013.01)

(58) Field of Classification Search
CPC ............ H01G 4/005; H01G 4/06; H01G 4/08; H01G 4/012; H01G 4/12; H01G 4/30;
(Continued)

(56) References Cited

U.S. PATENT DOCUMENTS 6,091,598 A * 7/2000 Kobayashi ............. H01G 4/304
    257/E21.53
6,278,602 B1 * 8/2001 Haratani ................ H01G 4/005
    361/303

(Continued)

FOREIGN PATENT DOCUMENTS

KR    10-2007-0103153 A    10/2007
KR    10-2018-0007865 A    1/2018

*Primary Examiner* — Eric W Thomas
(74) *Attorney, Agent, or Firm* — Morgan, Lewis & Bockius LLP

(57) ABSTRACT

A multilayer ceramic electronic component includes: a ceramic body including a dielectric layer and first and second internal electrodes alternately exposed to first and second outer surfaces with the dielectric layer interposed therebetween; and first and second external electrodes disposed on the first and second outer surfaces of the ceramic body so as to be connected to the first and second internal electrodes, respectively. The first internal electrode has a plurality of first ends connected to the first external electrode and a first recessed region positioned between the plurality of first ends, the first recessed region at least partially filled with a dielectric material. The second internal electrode has a plurality of second ends connected to the second external electrode and a second recessed region positioned between the plurality of second ends, the second recessed region at least partially filled with the dielectric material.

12 Claims, 4 Drawing Sheets

(51) Int. Cl.
*H01G 4/008* (2006.01)
*H01G 4/12* (2006.01)
*H01G 4/30* (2006.01)

(58) Field of Classification Search
CPC .......... H01G 4/40; H01G 4/232; H01G 4/248; H01G 4/1227
See application file for complete search history.

(56) References Cited

U.S. PATENT DOCUMENTS

| | | | |
|---|---|---|---|
| 6,414,417 B1* | 7/2002 | Tsuyoshi | H01L 41/0472 310/366 |
| 2003/0107867 A1* | 6/2003 | Iwase | H01G 4/30 361/301.4 |
| 2004/0178701 A1* | 9/2004 | Sato | H01L 41/0833 310/328 |
| 2008/0080121 A1* | 4/2008 | Togashi | H01G 4/30 361/303 |
| 2009/0126174 A1* | 5/2009 | Hong | H01G 4/1227 29/25.42 |
| 2010/0091426 A1* | 4/2010 | Motoki | H01C 1/148 361/301.4 |
| 2012/0140377 A1* | 6/2012 | Kim | H01G 4/30 361/321.2 |
| 2018/0019064 A1 | 1/2018 | Han et al. | |

* cited by examiner

MULTILAYER CERAMIC ELECTRONIC COMPONENT

CROSS-REFERENCE TO RELATED APPLICATION(S)

This application claims benefit of priority to Korean Patent Application No. 10-2018-0120587 filed on Oct. 10, 2018 in the Korean Intellectual Property Office, the disclosure of which is incorporated herein by reference in its entirety.

TECHNICAL FIELD

The present disclosure relates to a multilayer ceramic electronic component.

BACKGROUND

A multilayer ceramic electronic component has been widely used as a component of an information technology (IT) device such as a computer, a personal digital assistant (PDA), a cellular phone, or the like, since it has a small size, implements high capacitance, and may be easily mounted. A multilayer ceramic electronic component has also been widely used as an electrical component, since it has high reliability and high strength characteristics.

The multilayer ceramic electronic component may include a plurality of internal electrodes and a dielectric layer, providing capacitance. Since the plurality of internal electrodes and dielectric layers are different from each other, the multilayer ceramic electronic component may cause cracks and delamination during compression of the plurality of internal electrodes and the dielectric layer into a small space.

The cracks and delamination may occur more frequently according to miniaturization and high capacity of the multilayer ceramic electronic component, lowering reliability and productivity of the multilayer ceramic electronic component, and promoting permeation of moisture and a plating solution during manufacturing.

SUMMARY

An aspect of the present disclosure may provide a multilayer ceramic electronic component capable of suppressing cracks and delamination of an internal electrode and/or a dielectric layer.

According to an aspect of the present disclosure, a multilayer ceramic electronic component may include: a ceramic body including a dielectric layer, and first and second internal electrodes alternately exposed to first and second outer surfaces with the dielectric layer interposed therebetween; and first and second external electrodes disposed on the first and second outer surfaces of the ceramic body so as to be connected to the first and second internal electrodes, respectively. The first internal electrode may have a plurality of first ends connected to the first external electrode and a first recessed region positioned between the plurality of first ends, the first recessed region at least partially filled with a dielectric material. The second internal electrode may have a plurality of second ends connected to the second external electrode and a second recessed region positioned between the plurality of second ends, the second recessed region at least partially filled with the dielectric material.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

A multilayer ceramic electronic component according to an exemplary embodiment in the present disclosure, particularly, a multilayer ceramic capacitor will hereinafter be described. However, the multilayer ceramic electronic component according to the present disclosure is not limited thereto.

Figure 1:
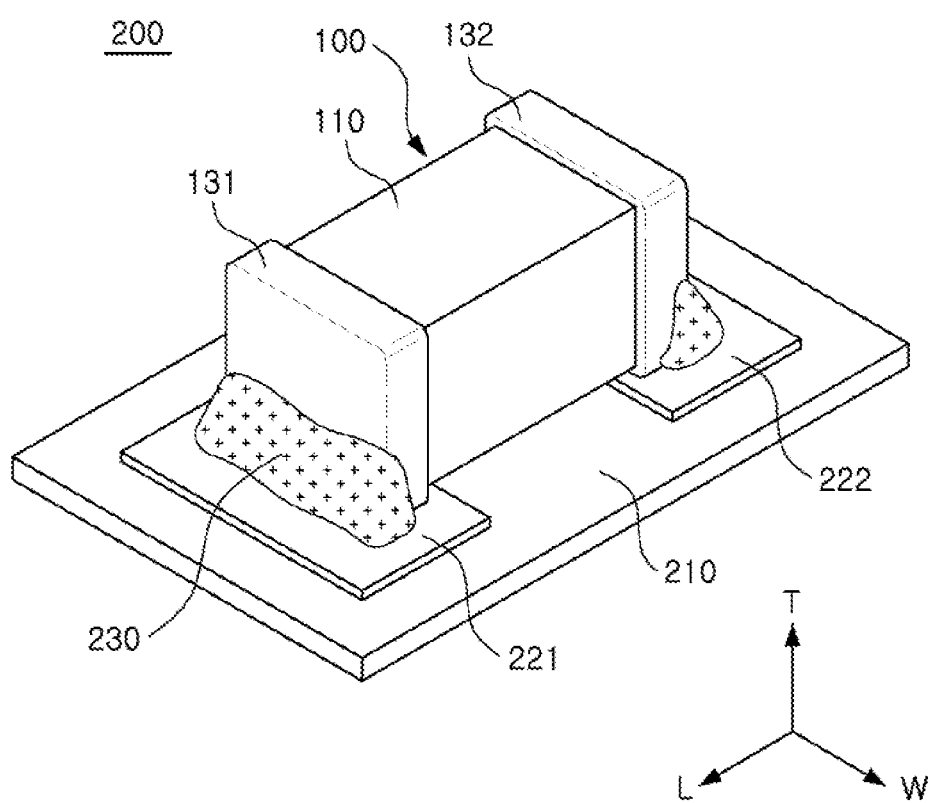
FIG. 1 is a perspective view showing a multilayer ceramic electronic component according to an exemplary embodiment of the present disclosure and a mounting thereof.

FIG. 1 is a perspective view showing a multilayer ceramic electronic component according to an exemplary embodiment of the present disclosure and a mounting thereof.

Referring to FIG. 1, a multilayer ceramic electronic component 100 according to an exemplary embodiment of the present disclosure may include a ceramic body 110 and first and second external electrodes 131 and 132, in which the multilayer ceramic electronic component 100 may be mounted (200) on first and second electrode pads 221 and 222 on a board 210.

The ceramic body 110 may be formed of a hexahedron having opposite end surfaces in a length direction L, opposite side surfaces in a width direction W, and opposite side surfaces in a thickness direction T. The ceramic body 110 may be formed by stacking a plurality of dielectric layers 111 in the thickness direction T and then sintering the plurality of dielectric layers 111 (shown in FIG. 4). A shape and a dimension of the ceramic body 110 and the number (one or more) of stacked dielectric layers 111 are not limited to those illustrated in the present exemplary embodiment.

The plurality of dielectric layers disposed in the ceramic body 110 may be in a sintered state, and adjacent dielectric layers may be integrated with each other so that boundaries therebetween are not readily apparent without using a scanning electron microscope (SEM).

For example, the ceramic body 110 may have a form in which eight corners of the hexahedron are round. Therefore, durability and reliability of the ceramic body 110 may be improved, and structural reliability of the first and second external electrodes 131 and 132 at the corners may be improved.

The dielectric layer may have a thickness arbitrarily changed in accordance with a capacitance design of the multilayer ceramic electronic component 100, and may include ceramic powders having a high dielectric constant, such as barium titanate ($BaTiO_3$) based powders or strontium titanate ($SrTiO_3$) based powders. However, a material of the dielectric layer according to the present disclosure is not limited thereto. In addition, various ceramic additives, organic solvents, plasticizers, binders, dispersants, and the like, may be added to the ceramic powders according to an object of the present disclosure.

An average particle size of the ceramic powders used to form the dielectric layer is not particularly limited, and may be controlled in order to accomplish an object of the present disclosure. For example, the average particle size of the ceramic powders used to form the dielectric layer may be controlled to be 400 nm or less. Therefore, the multilayer ceramic electronic component 100 according to an exemplary embodiment in the present disclosure may be used as a component that needs to be miniaturized and have a high capacitance, such as an information technology (IT) component.

For example, the dielectric layers may be formed by applying and then drying slurry including powders such as barium titanate ($BaTiO_3$) powders, or the like, to carrier films to prepare a plurality of ceramic sheets. The ceramic sheets may be formed by mixing ceramic powders, a binder, and a solvent with one another to prepare slurry and manufacturing the slurry in a sheet shape having a thickness of several micrometers by a doctor blade method, but are not limited thereto.

The first and second external electrodes 131 and 132 may be disposed on outer surfaces (for example, one surface and the other surface in the length direction) of the ceramic body 110 to be connected to the first and second internal electrodes, respectively, and may be configured to electrically connect the first and second internal electrodes 121 and 122 and a board to each other.

For example, the first and second external electrodes 131 and 132 may be formed of copper (Cu), palladium (Pd), platinum (Pt), gold (Au), silver (Ag), lead (Pb) or the like, or alloys thereof.

For example, the first and second external electrodes 131 and 132 may include first and second electrode layers including Cu or Ni and first and second plating layers disposed on the first and second electrode layers and including Ni or Sn.

The first and second electrode layers may be formed by a method of dipping the ceramic body 110 in a paste including a metal component or a method of printing a conductive paste including a conductive metal on at least one surface of the ceramic body 110 in the length direction L, and may also be formed by a sheet transfer method or a pad transfer method.

The first and second plating layers may be formed by sputtering or an electric deposition, but the first and second plating layers are not limited by the above methods.

The first and second external electrodes 131 and 132 may be electrically connected to the first and second electrode pads 221 and 222 by first and second solders 230. For example, the first and second solders 230 may be more closely coupled to the first and second external electrodes 131 and 132 according to a reflow process.

Figure 2:
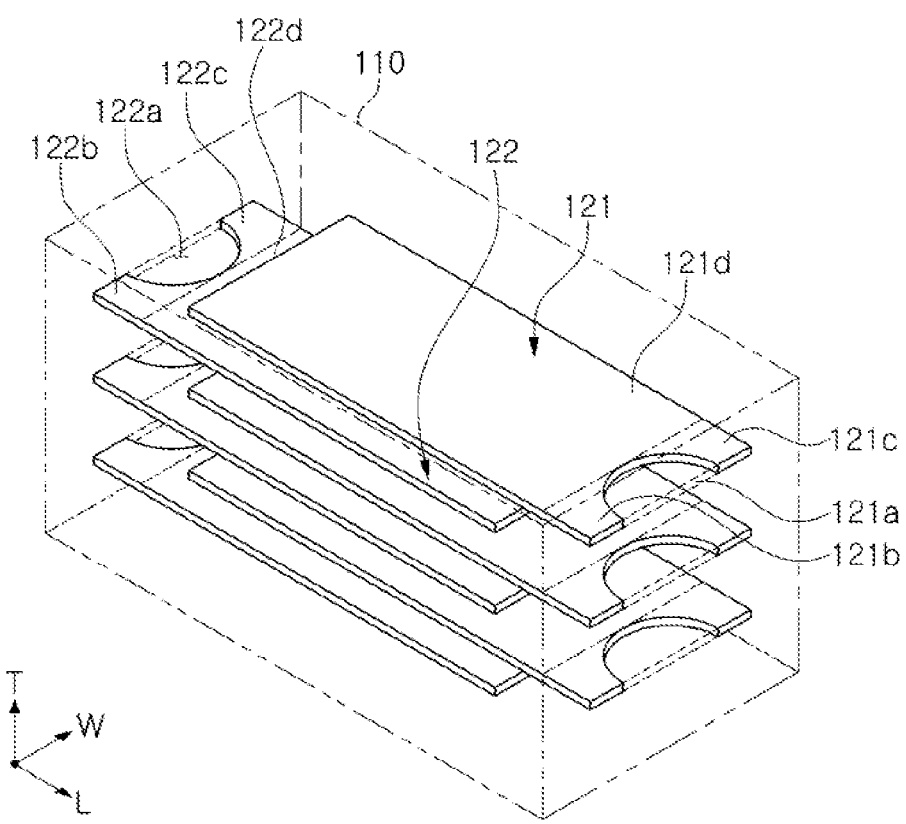
FIG. 2 is a perspective view showing a form of an internal electrode of the multilayer ceramic electronic component according to the exemplary embodiment of the present disclosure.

FIG. 2 is a perspective view showing a form of an internal electrode of the multilayer ceramic electronic component according to the exemplary embodiment of the present disclosure.

Referring to FIG. 2, the ceramic body 110 may include the first and second internal electrodes 121 and 122, and the dielectric layer disposed between the first and second internal electrodes 121 and 122.

The first and second internal electrodes 121 and 122 are stacked so as to be alternately exposed to the first and second outer surfaces (for example, one end surface and the other end surface in the length direction) with the dielectric layer interposed therebetween so as to have different polarities.

The first internal electrodes 121 and the second internal electrodes 122 may be formed to be alternately exposed to one end surface and the other end surface of the ceramic body 110 in the length direction L of the ceramic body 110 in the stack direction of the dielectric layers by printing a conductive paste including a conductive metal, and may be electrically insulated from each other by each of the dielectric layers interposed therebetween.

That is, the first and second internal electrodes 121 and 122 may be electrically connected to the first and second external electrodes 131 and 132 formed on opposite end surfaces of the ceramic body 110 in the length direction L of the ceramic body 110 through portions alternately exposed to the opposite end surfaces of the ceramic body 110 in the length direction of the ceramic body 110, respectively.

For example, the first and second internal electrodes 121 and 122 may have an average particle size of 0.1 to 0.2 μm, and may be formed of a conductive paste for an internal electrode including 40 to 50 wt % of conductive metal powders, but are not limited thereto.

The conductive paste for an internal electrode may be applied to the ceramic sheets by a printing method, or the like, to form internal electrode patterns. A method of printing the conductive paste may be a screen printing method, a gravure printing method, or the like, but is not limited thereto. Two hundred or three hundred ceramic sheets on which the internal electrode patterns are printed may be stacked, pressed, and sintered to manufacture the ceramic body 110.

Therefore, when voltages are applied to the first and second external electrodes, electric charges may be accumulated between the first and second internal electrodes 121 and 122 facing each other. In this case, a capacitance of the multilayer ceramic electronic component 100 may be in proportion to an area of a region in which the first and second internal electrodes 121 and 122 overlap each other.

That is, when the area of the region in which the first and second internal electrodes 121 and 122 overlap each other is significantly increased, a capacitance may be significantly increased even in a capacitor having the same size.

Thicknesses of the first and second internal electrodes 121 and 122 may be determined depending on the purpose, and may be, for example, 0.4 μm or less. In addition, the number of layers of the first and second internal electrodes 121 and 122 may be 400 or more. Therefore, the multilayer ceramic electronic component 100 may be used as a component that needs to be miniaturized and have a high capacitance, such as an information technology (IT) component.

Since the thickness of the dielectric layer corresponds to an interval between the first and second internal electrodes 121 and 122, the smaller the thickness of the dielectric layer, the greater the capacitance of the multilayer ceramic electronic component 100.

The conductive metal included in the conductive paste forming the first and second internal electrodes 121 and 122 may be nickel (Ni), copper (Cu), palladium (Pd), silver (Ag), lead (Pb), or platinum (Pt), or alloys thereof. However, the conductive metal according to the present disclosure is not limited thereto.

The larger the interval between the first and second internal electrodes 121 and 122, the more the withstand voltage characteristics of the ceramic body 110 may be improved.

When the multilayer ceramic electronic component 100 requires high withstand voltage characteristics such as electrical components, the multilayer ceramic electronic component 100 may be designed so that an average thickness of the dielectric layers 111 is twice as large as that of the first and second internal electrodes 121 and 122. Accordingly, the multilayer ceramic electronic device 100 may have the high withstand voltage characteristics so as to be used as electrical components.

In addition, the durability (for example, warpage endurance) of the ceramic body 110 may have high reliability when the width of the ceramic body 110 exceeds 0.5 times the thickness thereof.

The first internal electrode 121 may include a first capacitance region 121d, a plurality of first ends 121b and 121c connected to the first external electrode, and a first recessed region 121a positioned between the plurality of first ends 121b and 121c and at least partially filled with a dielectric material. The dielectric material filling the first recessed region 121a may be the same as that used to form the dielectric layers 111.

The second internal electrode 122 may include a second capacitance region 122d, a plurality of second ends 122b and 122c connected to the second external electrode, and a second recessed region 122a positioned between the plurality of second ends 122b and 122c and at least partially filled with a dielectric material. The dielectric material filling the second recessed region 122a may be the same as that used to form the dielectric layers 111.

Figure 3:
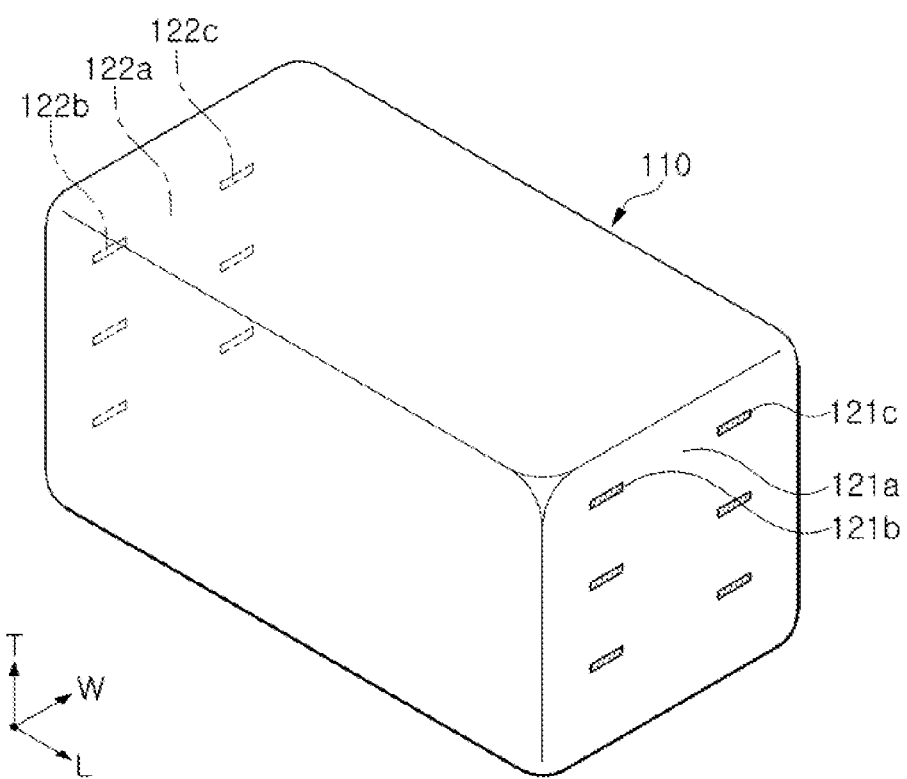
FIG. 3 is a perspective view showing an exposure of the internal electrode of the multilayer ceramic electronic component according to the exemplary embodiment of the present disclosure.

FIG. 3 is a perspective view showing an exposure of the internal electrode of the multilayer ceramic electronic component according to the exemplary embodiment of the present disclosure.

Referring to FIG. 3, the plurality of first ends 121b and 121c and the plurality of second ends 122b and 122c may be exposed to the first and second outer surfaces of the ceramic body 110.

Portions corresponding to the first and second recessed regions 121a and 122a in the first and second internal electrodes 121 and 122 may not be exposed to the first and second outer surfaces.

That is, the exposed areas of the first and second internal electrodes 121 and 122 may be reduced by the first and second recessed regions 121a and 122a, as compared to an example in which first and second internal electrodes include flat ends without recessed regions.

Figure 4:
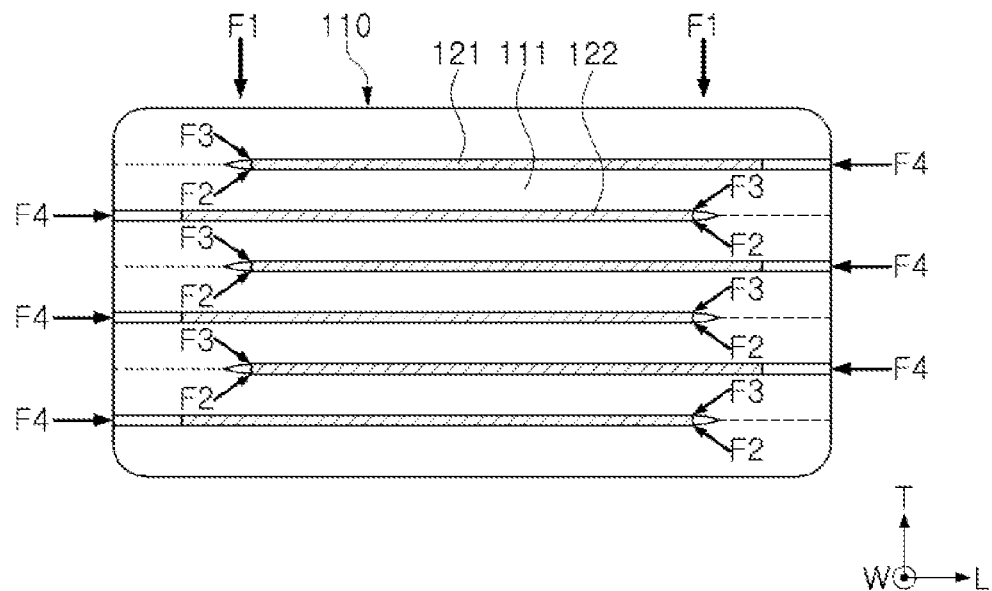
FIG. 4 is a side view showing a force between a dielectric layer and the internal electrode of the multilayer ceramic electronic component according to the exemplary embodiment of the present disclosure.

FIG. 4 is a side view showing a force between a dielectric layer and the internal electrode of the multilayer ceramic electronic component according to the exemplary embodiment of the present disclosure.

Referring to FIG. 4, the ceramic body 110 including the dielectric layer 111 and the first and second internal electrodes 121 and 122 may be compressed by being applied with a first force F1 in the thickness direction during the manufacturing process.

Accordingly, a part of the dielectric layer 111 may occupy a part of a space between the first internal electrode 121 and the second external electrode and a part of a space between the second internal electrode 122 and the first external electrode.

That is, the dielectric layer 111 may be configured to have a diagonal boundary line at an upper part or a lower part of the other end of each of the first and second internal electrodes 121 and 122.

In addition, the dielectric layer 111 may be configured so that a thickness at an upper part or a lower part of the plurality of first and second ends is greater than the thickness at the region in which the first and second internal electrodes 121 and 122 overlap each other.

Accordingly, the dielectric layer 111 may apply a second force F2 and a third force F3 toward the other ends of the first and second internal electrodes 121 and 122. A vector sum of the second and third forces F2 and F3 may be a longitudinal force, for example, a force in the length direction.

Generally, the longitudinal force may lower the durability of the dielectric layer 111 and the first and second internal electrodes 121 and 122 against the external impact (for example, friction with a blade in a process of cutting the ceramic body, separation of the ceramic body in a foaming process, collision between the ceramic bodies in a green polishing process, occurrence of a path at time of a de-binder in a plasticizing process, or the like), thereby causing the cracks and delamination of the first and second internal electrodes 121 and 122 and lowering the a bonding strength between an upper and/or lower dielectric layer of the ceramic body 110 and the dielectric layer 111.

The multilayer ceramic electronic device according to the exemplary embodiment of the present disclosure may be applied with a fourth force F4 due to a dielectric material filled in at least a part of the first and second recessed regions. On the same level in the thickness direction, for example, on the level of the same internal electrode, since the fourth force F4 is a reaction against the vector sum of the second and third forces F2 and F3, the second and third forces F2 and F3 applied on the same internal electrode may be reduced, as compared to an example in which an internal electrode does not have a recess region.

Therefore, the multilayer ceramic electronic component according to the exemplary embodiment of the present disclosure may suppress the cracks and delamination of the dielectric layer 111 and the first and second internal electrodes 121 and 122, and enhance the bonding strength between the upper and/or lower dielectric layer of the ceramic body 110 and the dielectric layer 111.

On the other hand, the dielectric material filled in at least a part of the first and second recessed regions may be filled with a density greater than that of the dielectric layer 111. Accordingly, the dielectric material may apply the fourth force (F4) larger than a unit size to the first and second internal electrodes 121 and 122.

For example, the first and second recessed regions may be filled with the dielectric material through a negative printing process, and the density of the dielectric material may be further increased by controlling the environment of the negative printing process.

On the other hand, the first and second internal electrodes 121 and 122 may include Ni for the efficiency of the manufacturing process, and the multilayer ceramic electronic component according to the exemplary embodiment of the present disclosure may enhance the bonding strength between Ni and the dielectric layer 111, thereby suppressing the crack and delamination.

Figure 5:
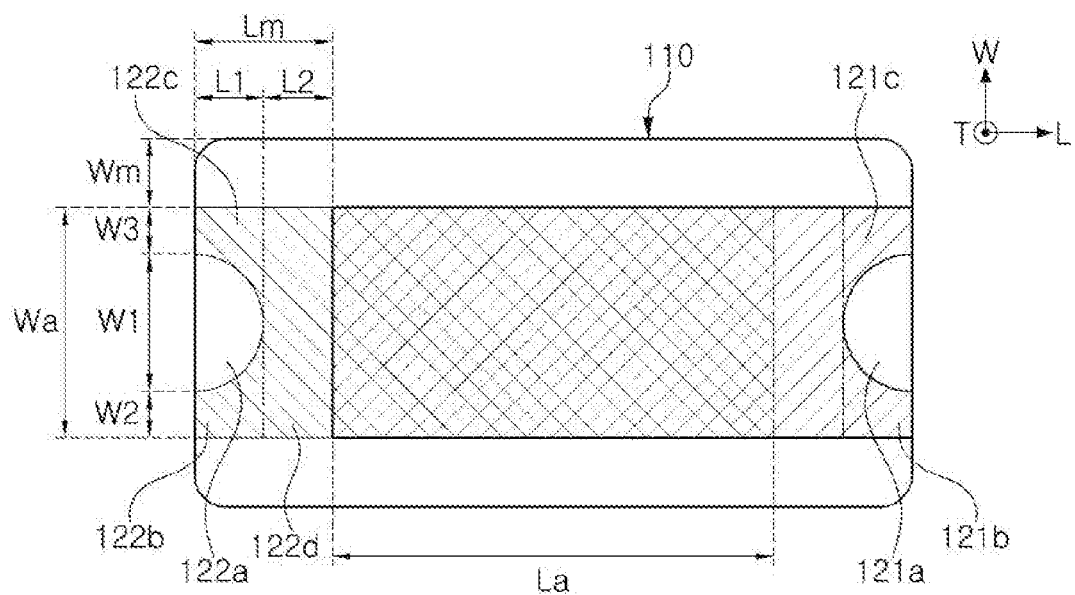
FIG. 5 is a plan view showing the internal electrode of the multilayer ceramic electronic component according to the exemplary embodiment of the present disclosure.

FIG. 5 is a plan view showing the internal electrode of the multilayer ceramic electronic component according to the exemplary embodiment of the present disclosure.

Referring to FIG. 5, the ceramic body 110 may have a length of (2*Lm+La) and a width of (2*Wm+Wa).

The first and second internal electrodes may have a region overlapping with each other when viewed in the thickness direction. The area of the overlap region may be determined by the product of La and Wa, and may correspond to the capacitance of the ceramic body 110.

The ceramic body 110 may have a longitudinal marginal portion having a length of Lm on each side of the ceramic body 110 in the length direction, and a widthwise marginal portion having a width of Wm on each side of the ceramic body 110 in the width direction.

The longitudinal marginal portion may have a first longitudinal marginal portion having a length of L1 and a second longitudinal marginal portion having a length of L2.

Referring to FIG. 5, at least a part of a boundary line of the first recessed region 121a may be an oblique with respect to the plurality of first ends 121b and 121c, and at least a part of a boundary line of the second recessed region 122a may be is an oblique with respect to the plurality of second ends 122b and 122c.

Accordingly, the first and second internal electrodes 121 and 122 may be applied with the longitudinal force so as to be larger than the size of the first and second recessed regions 121a and 122a from the dielectric material filled in the first and second recessed regions 121a and 122a.

The cracks and delamination of the first and second internal electrodes 121 and 122 and the dielectric layer may be suppressed without the sacrifice of the capacitance due to the increase in the size of the first and second recessed regions 121a and 122a.

Referring to FIG. 5, a total length (W2+W3) (in the width direction of the ceramic body 110) of the plurality of first ends may be shorter than half the width (2*Wm+Wa) of the ceramic body, and a total length (W2+W3) (in the width direction of the ceramic body 110) of the plurality of second ends may be less than half the width of the ceramic body (2*Wm+Wa).

Accordingly, the dielectric material filled in the first and second recessed regions 121a and 122a may be dominant to the longitudinal force during the sintering of the ceramic body 110. Therefore, the cracks and delamination of the first and second internal electrodes 121 and 122 and the dielectric layer may be suppressed more efficiently.

Referring to FIG. 5, an interval W1 between the plurality of first ends may be shorter than the total length (W2+W3) (in the width direction of the ceramic body 110) of the plurality of first ends, and an interval W1 between the plurality of second ends may be shorter than the total length (W2+W3) (in the width direction of the ceramic body 110) of the plurality of second ends.

Accordingly, the connection stability between the first and second internal electrodes 121 and 122 may be maintained and the first and second external electrodes may suppress a substantial increase in an equivalent series resistance (ESR).

Referring to FIG. 5, the first recessed region 121a may be configured not to overlap the second internal electrode 122 when viewed in the thickness direction, and the second recessed region 122a may be configured not to overlap the first internal electrode 121 when viewed in the thickness direction.

Therefore, the cracks and delamination of the first and second internal electrodes 121 and 122 and the dielectric layer may be suppressed without the sacrifice of the capacitance of the ceramic body 110.

Referring to FIG. 5, the first and second recessed regions 121a and 122a may each have a semicircular shape. Accordingly, the first and second recessed regions 121a and 122a may be formed to have the high reliability.

For example, the first and second recessed regions 121a and 122a may be formed in a circular shape at the boundary line of the plurality of ceramic bodies 110 in a state in which the plurality of ceramic bodies 110 are bonded to each other. Thereafter, the plurality of ceramic bodies 110 may be cut. In this case, the first and second recessed regions 121a and 122a may have a semicircular shape.

As set forth above, according to the exemplary embodiment of the present disclosure, the multilayer ceramic electronic component may suppress the cracks and delamination of the internal electrode and/or the dielectric layer.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
   a ceramic body including a dielectric layer, and first and second internal electrodes alternately exposed to first and second outer surfaces with the dielectric layer interposed therebetween; and
   first and second external electrodes disposed on the first and second outer surfaces of the ceramic body so as to be connected to the first and second internal electrodes, respectively,
   wherein the first internal electrode has a plurality of first ends connected to the first external electrode and a first recessed region positioned between the plurality of first ends, the first recessed region at least partially filled with a dielectric material, and
   the second internal electrode has a plurality of second ends connected to the second external electrode and a second recessed region positioned between the plurality of second ends, the second recessed region at least partially filled with the dielectric material,
   in a cross-section cut across the first and second outer surfaces and the first and second recessed regions, the dielectric layer has a diagonal boundary line on only an upper part, a lower part, or both the upper part and the lower part of the other end of each of the first and second internal electrodes.

2. The multilayer ceramic electronic component of claim 1, wherein at least a part of a boundary line of the first recessed region is an oblique with respect to the plurality of first ends, and
   at least a part of a boundary line of the second recessed region is an oblique with respect to the plurality of second ends.

3. The multilayer ceramic electronic component of claim 2, wherein a total length, in a width direction of the ceramic body, of the plurality of first ends is shorter than half a width of the ceramic body, and
   a total length, in the width direction of the ceramic body, of the plurality of second ends is shorter than half the width of the ceramic body.

4. The multilayer ceramic electronic component of claim 3, wherein an interval between the plurality of first ends is shorter than the total length of the plurality of first ends, and
   wherein an interval between the plurality of second ends is shorter than the total length of the plurality of second ends.

5. The multilayer ceramic electronic component of claim 2, wherein the first recessed region is spaced apart from the second internal electrode when viewed in a thickness direction of the ceramic body, and
the second recessed region is spaced apart from the first internal electrode when viewed in the thickness direction.

6. The multilayer ceramic electronic component of claim 1, wherein each of the first and second recessed regions has a semicircular shape.

7. The multilayer ceramic electronic component of claim 1, wherein a thickness of a region of the dielectric layer at an upper part or a lower part of the plurality of first and second ends is larger than that of another region of the dielectric layer between the first and second internal electrodes.

8. The multilayer ceramic electronic component of claim 1, wherein the dielectric material filled in at least a part of the first and second recessed regions is filled with a density larger than the dielectric layer.

9. The multilayer ceramic electronic component of claim 1, wherein the first and second internal electrodes include Ni.

10. The multilayer ceramic electronic component of claim 1, wherein the plurality of first ends and the first recessed region are exposed to the first outer surface, and the plurality of second ends and the second recessed region are exposed to the second outer surface.

11. The multilayer ceramic electronic component of claim 1, wherein the dielectric material at least partially filling the first recessed region is spaced apart from the second external electrode, and
the dielectric material at least partially filling the second recessed region is spaced apart from the first external electrode.

12. The multilayer ceramic electronic component of claim 1, wherein the dielectric material at least partially filling the first recessed region is in contact with the first external electrode, and
the dielectric material at least partially filling the second recessed region is in contact with the second external electrode.

* * * * *